US005644997A

United States Patent [19]

Martin et al.

[11] Patent Number: 5,644,997

[45] Date of Patent: Jul. 8, 1997

[54] WASTE PYROLYSIS ROTARY FURNACE WITH INTERNAL HEATING

[75] Inventors: Gérard Martin; Eric Marty, both of Rueil-Malmaison, France

[73] Assignee: Institut Francais du Petrole, Rueil Malmaison, France

[21] Appl. No.: 454,563

[22] Filed: May 30, 1995

[30] Foreign Application Priority Data

May 30, 1994 [FR] France .................................. 94 06660

[51] Int. Cl.$^{6}$ .................................................. A47J 36/00

[52] U.S. Cl. .......................... 110/246; 110/346; 110/229; 432/114

[58] Field of Search .................................... 110/226, 229, 110/246, 257, 346; 432/103, 108, 110, 112, 114

[56] References Cited

U.S. PATENT DOCUMENTS 1,508,578 9/1924 Ruhr .
3,481,720 12/1969 Bennett .
3,861,336 1/1975 Koyanagi et al. .................. 110/246 X
4,066,024 1/1978 O'Connor .
4,730,564 3/1988 Abboud .................................. 110/246
5,273,355 12/1993 May et al. .......................... 110/226 X

FOREIGN PATENT DOCUMENTS 0056931 8/1982 European Pat. Off. .
0072164 2/1983 European Pat. Off. .
0446930 9/1991 European Pat. Off. .

*Primary Examiner*—Henry A. Bennett
*Assistant Examiner*—Susanne C. Tinker
*Attorney, Agent, or Firm*—Antonelli, Terry, Stout & Kraus, LLP

[57] ABSTRACT

The present invention relates to a furnace intended for the thermal treatment of solid materials, comprising a rotary element (1) in which said solid materials circulate longitudinally, and a means (9) for heating said materials, which extends longitudinally in the furnace, the solid materials moving forward through about two lengths inside the rotary element (1). According to the invention, the heating means (9) is stationary, intended for channelling the solid materials and for preheating them. More specifically, the heating means (9) is arranged coaxially and inside the rotary element (1) so that, in the axial zone delimited by the heating means, the solid materials exhibit the highest temperatures.

8 Claims, 1 Drawing Sheet

WASTE PYROLYSIS ROTARY FURNACE WITH INTERNAL HEATING

BACKGROUND OF THE INVENTION

The present invention relates to the field of furnaces for the thermal treatment of solid materials, and more particularly to pyrolysis (or thermolysis) furnaces intended for treating solids such as waste of all kinds.

The furnaces concerned are generally cylindrical and rotate about their axis of symmetry. The heat input necessary for pyrolysis can consist of solids or of gases in contact or not with the solids to be treated.

Patent application FR-2,668,774 thus describes a pyrolysis furnace in which heating can be performed outside the furnace by pyrolysis gas-fed burners; according to another embodiment, heat-carrying solids are brought into contact with the waste to be pyrolyzed inside the furnace. An additional reactor is then necessary for heating the heat-carrying solids.

This type of installation entails a complex implementation and proves to be a big energy consumer.

Furthermore, the numerous connections make the installation more costly, less reliable and above all decrease its thermal efficiency.

One way of solving partly these problems consists for example in making the furnace more compact. Document DE 29 03 280 discloses a compact rotary furnace in which the waste to be treated passes successively through a first rotary cylinder, then through a rotary ring coaxial to the cylinder. The waste is heated by heat-carrying gases circulating around the cylinders. An external rotating jacket delimits the heating zone.

Although it allows, by its compactness, to obtain a higher thermal efficiency, this type of installation remains complex, notably at the level of the shape of the cylinders; furthermore, since the heating means and the fumes discharge means are not stationary, problems may arise at the level of the connections. This type of installation, like most of the known rotary furnaces, must be considered as external indirect heating rotary furnaces.

SUMMARY OF THE INVENTION

The present invention represents an improvement of the known rotary pyrolysis furnaces.

It presents advantages at the level of its construction since the rotary cylinder is simple.

Furthermore, only one element is rotary, which simplifies the connections.

Besides, concerning its operation, the present invention avoids problems of obstruction by large solids, inert or not yet thermally degraded. Risks of sticking are nearly nonexistent and very distinctly decreased in relation to the known systems.

According to the present invention, access and dismantling are particularly facilitated, which is very important and appreciated by operators.

Finally, the thermal efficiency is markedly improved by the extreme compactness of the device according to the invention.

The thermal efficiency is still improved by the fact that the highest temperatures are clearly localized in the centre of the system.

In document DE 2 903 280 for example, the hottest zone is located on the periphery, which is penalizing as regards heat losses.

The objectives, advantages and improvements which have been stated are thus reached according to the present invention by means of a furnace intended for the thermal treatment of solid materials, comprising a rotary element in which said solid materials circulate longitudinally, and a heating means for said materials, which extends longitudinally in the furnace, the solid materials moving forward through about two lengths inside the rotary element.

According to the invention, the heating means is stationary, intended for channelling the solid materials and for ensuring their preheating and/or their heating.

More precisely, the heating means is stationary, arranged coaxially and inside the rotary element so that, in the axial zone delimited by the heating means, the solid materials exhibit the highest temperatures.

Advantageously, the heating means comprises at least one tubular element whose branch or branches are parallel to the longitudinal axis of the furnace, the branch or branches are connected by membranes, the assembly having a general cylindrical shape.

This layout allows a very interesting thermal efficiency to be obtained.

Without departing from the scope of the invention, a heat-carrying fluid circulates in the heating means in a cocurrent and/or a countercurrent flow with respect to the solid materials.

Preferably, the furnace according to the invention can comprise tubular elements which are fed independently of one another.

By using a stationary heating system, the furnace according to the invention allows to re-use the hot fluids more easily than in the case of a rotary heating system. This is another way of increasing the energetic performance of the installation, because the sensible heat of the fumes produced can be efficiently recovered.

Without departing from the scope of the invention, the heating means can consist of an element of general cylindrical shape around or inside which resistive elements are arranged.

BRIEF DESCRIPTION OF THE DRAWINGS

Other details, features and advantages of the invention will be clear from reading the description hereafter, given by way of non limitative examples, with reference to the accompanying drawings in which.

DESCRIPTION OF THE PREFERRED EMBODIMENTS

Figure 1:
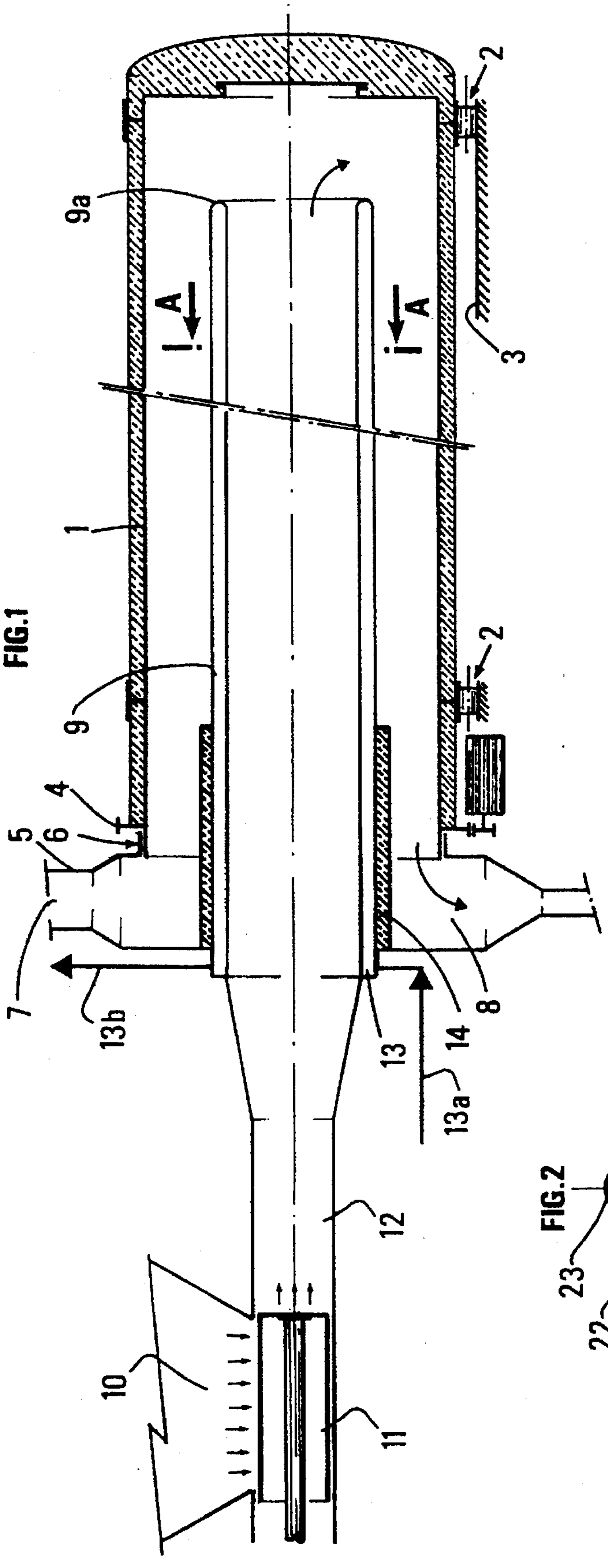
FIG. 1 is a simplified longitudinal section of the installation according to the invention.

The type of furnace illustrated in FIG. 1 comprises a rotary cylinder 1 of horizontal axis or slightly inclined according to the solids inventory and flow requirements. This rotary cylinder is mounted for example on rollers 2 which are fastened to a base 3 supporting the main part of the furnace equipment. Said rotary cylinder is equipped with an assembly 4 which ensures its rotation at a speed ranging preferably between 0.1 and 20 rpm.

The cylinder is connected to a stationary part 5 by means of a joint 6 which provides a complete seal between the furnace ambience and the outside. This joint 6 can be what is commonly referred to as a rotary seal by the man skilled in the art. Said stationary part 5 comprises an outlet 7 for the gases produced in the rotary cylinder and an outlet 8 for the solids resulting from the treatment.

This stationary part supports a stationary element 9 of substantially cylindrical shape having an end or "outlet" 9*a*. Element 9 preferably extends over almost the total length of cylinder 1. Device 9 is used for heating the inside of the furnace and for channelling the waste up to the end of the rotary cylinder 1 opposite the end where said waste to be treated is fed in. The waste comes from a hopper or any storage device 10. It is fed into the furnace at a controlled flow rate by means of a tappet-actuated device 11 such as that shown in FIG. 1, or by means of any other device known to the man skilled in the art (endless screw for example).

The transfer from the hopper to the furnace occurs through a line 12 in which the waste is more or less compacted if it exhibits a large volume in its raw state. The waste moves forward in device 9 in a more or less compact piston flow while being preheated. At the end 9*a* of the heating element 9, the waste falls into the rotary cylinder by gravity, and flows progressively longitudinally towards outlet 8. The waste thus performs a round trip in the furnace.

Figure 2:
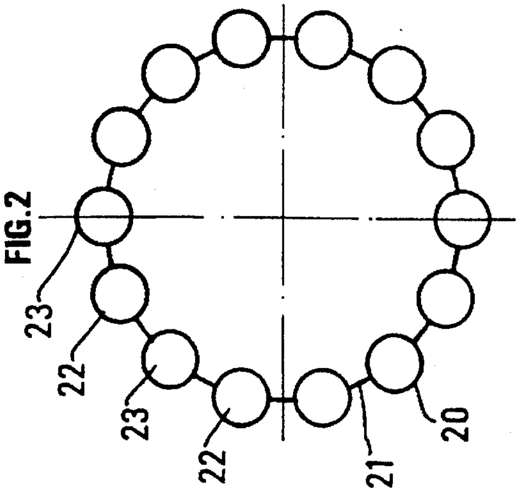
FIG. 2 shows the installation along the section AA of FIG. 1.

As shown in FIG. 2, the heating device 9 can consist of an array of tubular elements 20 connected to one another by membranes 21, providing a continuity over the whole device which exhibits a general cylindrical shape.

The tubular elements are preferably grouped together by 2, 4, 6, etc, in the form of hairpins in which a hot fluid circulates or in which a combustion operation is carried out. These hairpins are connected to a collector 13 fastened to the stationary part 5 or located next to this stationary part 5.

Collector 13 comprises a zone 13*a* for the hot fluid supply or the air and fuel supply, and a zone 13*b* for the discharge of the cooled fluid or of the fumes. There is on no account a contact between the fluid or the fumes used for heating tubes 20 on the one hand, and the gases contained in the cylinder 1 and the stationary part 5 on the other hand.

In the case of FIG. 2, device 9 consists of simple hairpins having two types of tubes 20: tubes of type 22 in which the fluid circulates in a cocurrent flow to the waste inside device 9 and tubes of type 23 interposed between tubes 22 in which the fluid circulates in a countercurrent flow to the waste.

The tubes can be heated for example through the combustion of a gaseous fuel.

The gaseous fuel can be natural gas or even gases resulting from the pyrolytic treatment of the waste, said gases having been previously and preferably treated in order to remove the tars and the particles which might lead to undesirable fouling phenomena.

The description stated above is of course not limitative, and the heating device 9 might as well consist of a substantially cylindrical tube, equipped with electric heating means such as resistors, wound helically around or inside said tube, with connections located outside at the level of a supply box.

The furnace according to the invention is preferably intended for treating the waste at temperatures ranging between 50° and 900° C., with final temperatures of the pyrolysis products at the furnace outlet preferably ranging between 400° and 600° C. The temperatures at the level of the heating device 9 range between 100° and 2000° C. and preferably between 600° and 1000° C. Tubes 20, 21, 22 ensure a first heating (or preheating) of the waste through the internal face of device 9, while the latter moves forward within device 9. The heat input supplied to the waste continues when the latter has left device 9, by means of the external face of said device 9. Heating of the waste is then achieved by the external face of device 9, which emits energy by radiation, either directly on the waste, or on the inner wall of cylinder 1 which reflects it back onto the waste.

Part of the internal face or of the external face can be concealed by an insulating mask 14 as shown in FIG. 1, for controlling and limiting the heat input at any point of the system.

The furnace according to the present invention implies a priori the use, for heating, of hot fluids or of clean fuels such as natural gas or the pyrolysis gases cleared of their tars and other particles.

Without departing from the scope of the present invention, the hot fluid can be air for example preheated at a temperature ranging between 500° and 1000° C. in a boiler burning raw pyrolysis gases.

The description above shows that the present invention affords a certain number of advantages notably in relation to a conventional installation comprising a rotary cylinder externally heated by burners or a heat-carrying fluid surrounding the rotary cylinder.

More precisely:

The absence of external heating means reduces the investment costs and definitely decreases the heat losses for at least two reasons: the hottest points are in the center of the device and not on the periphery, and the external surface of the hot parts is substantially reduced in the absence of a jacket surrounding the rotary cylinder.

The present invention allows the energetic efficiency of the installation to be very substantially increased, because the heat losses are considerably reduced on the one hand, and because the fumes or the hot fluid used for heating are perfectly channelled and can be re-used without any problem at another point of the process on the other hand, whereas with a conventional system, the dilution of the fumes through inevitable parasitic indrafts rather restricts the possibilities of optimum use of the energy content of the waste.

Furthermore, the present invention provides greater opportunities for controlling and for modulating the heating of the rotary cylinder, notably through the possibility of feeding independently the different tubes making up the heating system.

Moreover, the furnace according to the invention exhibits a lower thermal inertia of the assembly, which allows much faster starts, and increases the safety conditions in case of sudden stops. For example, when a conventional furnace has to be stopped rapidly because of a mishap on the pyrolysis gas incinerator, all the energy accumulated in the refractory still heats the rotary cylinder, the pyrolysis continues and generates gases that cannot be burnt, which may produce an explosive situation. According to the invention, the heating means have a much lower inertia, and the hot fluid or fuel feed stop being instantaneous, the pyrolysis process can be stopped within much shorter time intervals.

Besides, simplifications as regards the design and the construction of the furnace are achieved according to the invention because, for a given power, the rotary cylinder is smaller than with a conventional furnace. Moreover, a single seal is to be provided instead of two, and finally thermal expansion problems are simplified, the rotary cylinder being connected to a single stationary point, whereas with the known assemblies, the rotary cylinder is generally linked to two stationary points.

We claim:

1. A furnace for the thermal treatment of solid materials which comprises a rotary element in which said solid materials circulate longitudinally; a heating means for heating said solid materials which extends longitudinally in the furnace, said heating means comprising a stationary tubular array of heating elements arranged coaxially and inside the rotary element; and means for moving the solid materials forward initially through the tubular array and then through a space between the tubular array and the rotary element; said tubular array defining an axial zone wherein the solid materials receive highest temperatures of the thermal treatment.

2. A furnace as claimed in claim 1, wherein said heating means comprises a plurality of tubular heating elements having at least one branch parallel to a longitudinal axis of the tubular array, said heating elements being connected by membranes to provide the tubular array with a generally cylindrical shape.

3. A furnace as claimed in claim 1, wherein a heat-carrying fluid circulates in the heating elements in at least one of a cocurrent and a countercurrent flow with respect to movement of the solid materials.

4. A furnace as claimed in claim 2, wherein the tubular heating elements are fed with a heat carrying fluid independently of one another.

5. A furnace as claimed in claim 1, which further comprises a first stationary means for discharging gases produced in the rotary element and a second stationary means for discharging solids resulting from thermal treatment; said first and second stationary means being arranged transversely to a longitudinal axis of the tubular array.

6. A furnace as claimed in claim 1, wherein the tubular array has a generally cylindrical shape and said heating elements comprise a plurality of resistive elements.

7. A furnace according to claim 5, wherein said furnace further comprises an insulating element surrounding a portion of the tubular array of heating elements and being located adjacent to the first and second stationary means.

8. A method for effecting pyrolysis of waste solid materials which comprises introducing said waste solid materials into the stationary tubular array of heating elements in the furnace of claim 5, moving the waste solid materials through the stationary tubular array and through the space between the tubular array and the rotary element to effect pyrolysis of the waste solid materials; removing gases generated by the pyrolysis by the first stationary means and removing solids resulting from the pyrolysis by the second stationary means.

* * * * *